(12) United States Patent
Lok et al.

(10) Patent No.: US 10,943,313 B2
(45) Date of Patent: *Mar. 9, 2021

(54) IMPLEMENTED PER-ROOM VLANS

(71) Applicant: RG Nets, Inc., Reno, NV (US)

(72) Inventors: Simon C. Lok, Howard Beach, NY (US); Nicholas C. Rogers, Lyons, CO (US); Darrian J. Hale, Reno, NV (US)

(73) Assignee: RG NETS, INC., Reno, NV (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/428,710

(22) Filed: May 31, 2019

(65) Prior Publication Data

US 2019/0355075 A1 Nov. 21, 2019

Related U.S. Application Data

(63) Continuation of application No. 15/979,864, filed on May 15, 2018, now Pat. No. 10,354,346.

(51) Int. Cl.
| | |
|---|---|
| *G06Q 50/12* | (2012.01) |
| *H04L 29/06* | (2006.01) |
| *G06F 21/45* | (2013.01) |
| *H04W 12/06* | (2021.01) |
| *G06F 16/178* | (2019.01) |

(52) U.S. Cl.
CPC .......... *G06Q 50/12* (2013.01); *G06F 16/178* (2019.01); *G06F 21/45* (2013.01); *H04L 63/0892* (2013.01); *H04W 12/06* (2013.01)

(58) Field of Classification Search
CPC ....... G06Q 50/12; G06F 16/178; G06F 21/45; H04L 63/0892; H04L 63/0272; H04W 12/06
See application file for complete search history.

(56) References Cited

U.S. PATENT DOCUMENTS

| | | | |
|---|---|---|---|
| 6,539,019 | B1 | 3/2003 | Noy et al. |
| 7,379,443 | B2 | 3/2008 | Ahuja et al. |
| 7,447,188 | B1 | 11/2008 | Dommety et al. |
| 7,492,766 | B2 | 2/2009 | Cabeca et al. |
| 7,606,232 | B1 | 10/2009 | Ruben et al. |
| 7,636,360 | B2 | 12/2009 | Nagai et al. |
| 7,688,829 | B2 | 3/2010 | Guichard et al. |
| 7,693,158 | B1 | 4/2010 | Carrie |
| 7,944,918 | B2 | 5/2011 | Cabeca et al. |
| 7,983,258 | B1 | 7/2011 | Ruben et al. |
| 8,537,716 | B2 | 9/2013 | Gudipudi et al. |
| 9,025,533 | B1 | 5/2015 | Lok et al. |
| 9,137,238 | B1 * | 9/2015 | Jakobsson ............ H04L 63/083 |
| 2003/0140132 | A1 * | 7/2003 | Champagne .......... H04L 41/082 709/223 |
| 2003/0200107 | A1 * | 10/2003 | Allen ..................... G06Q 10/10 705/35 |

(Continued)

*Primary Examiner* — Christine Ng
(74) *Attorney, Agent, or Firm* — Cislo & Thomas, LLP

(57) ABSTRACT

An inventive system related to implementation of dynamic virtual local area network (VLAN) assignment and provisioning in communication networks. The inventive system enables per-room 802.1q VLANs that are enforced through 802.1X distribution equipment. This inventive system enables facilities such as hotels to implement per-room VLANs to increase security and efficiency in handling a plurality of devices brought in by guests as well as devices that are provided by the facility itself.

20 Claims, 5 Drawing Sheets

(56) References Cited

U.S. PATENT DOCUMENTS

| | | | |
|---|---|---|---|
| 2006/0274744 A1 | 12/2006 | Nagai et al. | |
| 2007/0071012 A1 | 3/2007 | Park et al. | |
| 2007/0244713 A1* | 10/2007 | Anderson | G06Q 50/06 705/314 |
| 2010/0302932 A1* | 12/2010 | Himeno | H04L 12/4633 370/216 |
| 2011/0004918 A1* | 1/2011 | Chow | H04L 63/08 726/3 |
| 2011/0222439 A1 | 9/2011 | Long | |
| 2012/0096159 A1* | 4/2012 | Short | H04L 63/08 709/225 |
| 2013/0346564 A1* | 12/2013 | Warrick | H04L 41/0816 709/219 |
| 2015/0341327 A1* | 11/2015 | Barton | H04L 63/083 713/168 |

\* cited by examiner

400

| Username 402 | Password 404 | VLAN 406 |
|---|---|---|
| NICHOLAS | C0URTL@ND | 1208 |
| DARRIAN | WH33LS | 1336 |
| KEENAN | 88KK48 | 1336 |
| JEREMY | 88GUNS | 1863 |
| . . . | . . . | . . . |
| SIMON | 123HELL0 | 2128 |

FIGURE 4

| MAC 502 | VLAN 504 | Premises Equipment 506 |
|---|---|---|
| aa:bb:aa:cc:00:01 | 1003 | True |
| ba:aa:ba:cd:21:01 | 1003 | False |
| . | . | . |
| . | . | . |
| . | . | . |
| 34:dd:ba:ee:98:e1 | 1145 | False |

500

| Room 512 | VLAN 514 | Last Name 516 |
|---|---|---|
| 201 | 1009 | Rogers |
| 202 | 1010 | Hale |
| . | . | . |
| . | . | . |
| . | . | . |
| 328 | 1145 | Klinger |

IMPLEMENTED PER-ROOM VLANS

CLAIM FOR PRIORITY

This application claims priority as a continuation of U.S. application Ser. No. 15/979,864 entitled "Implemented Per Room VLANS," filed on May 15, 2018, the contents of said application incorporated herein, in its entirety.

TECHNICAL FIELD

This system relates to implementing dynamic virtual local area network (VLAN) assignment and provisioning in communication networks.

BACKGROUND

Guest high-speed Internet access (HSIA) is a required amenity for all hospitality properties today. Implementing a guest HSIA network requires considering numerous special circumstances that are unique to the hospitality industry.

Hospitality guest HSIA networks are built around the need to support the ability for end-users to "bring your own device" (BYOD). The network infrastructure required to enable end-users to BYOD is radically different from typical corporate networks. Each and every device that is permitted onto the network is owned by the company and supported by enterprise IT in most corporate networks. BYOD networks face complex challenges that are not present in corporate networks which are purposefully restricted to servicing a homogeneous set of devices that are policed by a central authority.

Authentication and authorization of devices on a typical corporate network is largely a matter of maintaining a database of all known devices as well as a mapping between the known devices to network privileges and logical organization/data-link topology. For example, a laptop connected to an corporate IT network is known to be a device that is used by a regional sales manager because the end-user entered valid credentials at the operating system login prompt. The network AAA system is then able to authorize the authenticated device for specific network privileges such as membership to the VLAN for sales managers.

Most hotels want to restrict access to the guest HSIA network to guests who are checked into rooms. However, in a guest HSIA network there is no a-priori knowledge regarding the set of permissible devices nor a mapping between devices and privileges. Thus most guest HSIA networks operate with bare minimum authentication policies.

Properties deploy hospitality industry specific customer relationship management (CRM) systems that are that are called property management systems (PMS). The use of an Internet gateway that authenticates PMS credentials (typically room number and last name) is the most common form of a bare minimum authentication policy for guest HSIA networks. Credentials usually take the form of a last name and room number tuple and are usually gathered via forced web browser redirect to a captive portal. Such mechanisms allow all devices, valid or otherwise, to connect to the local area network that is almost universally deployed as a single large broadcast domain. The systems then selectively enable those devices that have provided valid credentials to pass traffic to and from the Internet uplink.

Hospitality guest HSIA network requirements have evolved over time with the proliferation of Internet connected devices. Guest HSIA networks were originally designed to support each guest bringing a single laptop computer with specific use case emphasis on business travelers. The single device use case is well addressed by the bare minimum on/off authentication policy implemented in a classic guest HSIA network composed of a single large broadcast domain architecture. However the basic bare minimum approach fails to address contemporary guest HSIA needs.

Contemporary hotel guest HSIA requirements emphasize the deployment of personal area networks (PAN) to deliver a "home-like" network experience guests. The goal is to allow guest devices to interact with each other as if they were connected to their home network. The "home-like" interaction requirement is in addition to the basic BYOD requirement that existed previously. Furthermore the contemporary hotel guest room is equipped with numerous network connected devices including but not limited to smart TVs, thermostats, light and window blind controllers.

The desire for personal area networks drives hotel guest HSIA architectures towards congruence with that of corporate network architectures. From a L2 networking perspective it is possible to treat rooms in a hotel in a manner similar to departments in a company. IEEE 802.1q VLANs are used to provide L2 segmentation at the departmental level in a typical corporate network. Similarly VLANs may be used in a guest HSIA network architecture to implement guest room PANs. Assigning each guest room a unique VLAN and placing guest devices into the room VLAN provides an environment for the guest devices to communicate in the same manner that the devices would exhibit at the guest's home. However the admission control and device VLAN mapping of a hospitality guest HSIA network is an extremely complex problem.

Admission of wireless devices onto a corporate network is typically achieved through WPA2 Enterprise with 802.1X. Similarly admission of wireline devices is achieved through switch port 802.1X. Most 802.1X clients that including but not limited to those built into Microsoft Windows, Apple MacOS X, Google Android and Apple iOS present a credential challenge that asks for a username and password. Thus most IBBEEE 802.1q enabled networks use AAA servers to store username/password tuple to VLAN mappings. Distribution equipment that utilizes 802.1X for admission is almost always capable of assigning an 802.1q VLAN during the admission process. The use of 802.1X is unlike the forced browser redirect to a captive portal approach in that the devices need not be connected to the LAN in order to provide credentials.

Both authentication and authorization of VLAN assignment is usually accomplished through RADIUS communication with a AAA server. The IT administrator typically maintains credentials and VLAN mappings through a manual process. Corporate IT has a complete understanding of every device that will be admitted to the network as these devices are owned by the corporation. Device turnover is typically budgeted and staged thus making manual management reasonable.

The use of 802.1q VLANs to deploy PANs drives hospitality guest HSIA AAA requirements towards a superset of those typically found in a corporate network. The classic hotel guest HSIA network authentication approach of forced browser redirect to a captive portal in order to collect credentials for a binary authentication decision is completely incompatible with a network architecture that incorporates a separate broadcast domain for each room. The foremost problem is that the operation of forced browser redirect to a captive portal requires that the guest device to already be connected to the local area network. This is a reasonable assumption in the classic guest HSIA network architecture where there is only a single broadcast domain. However in a guest HSIA network architecture where 802.1q VLANs are used to enable per-room PAN the VLAN should be known before the device is admitted to the local area network. Thus a paradox exists that prevents the typical forced browser redirect approach to a captive portal approach to function in a guest HSIA network with PANs implemented through 802.1q VLANs.

Admission to a PAN network architecture where one VLAN is created per room should involve a AAA process that is similar to binding a corporate device to a departmental L2 where there is one VLAN per department. Thus a hospitality guest HSIA network that implements PAN via 802.1q VLANs will typically have a AAA server present that stores credentials and the device to VLAN mapping similar to a 802.1q enabled corporate LAN. However the guest HSIA network authentication and authorization paradigm is more complex in that the hotel guest HSIA network involves broad spectrum BYOD whereas the corporate network is composed entirely of devices that are authorized by corporate IT.

For the foregoing reasons, there is a need for a system that enables a hospitality property to deploy a guest HSIA network with PANs using the per-room VLAN approach that interoperates with 802.1X enabled wireless and wireline network distribution equipment.

SUMMARY

The present invention is directed to a system that enables a hospitality property to deploy a guest HSIA network using the per-room 802.1q VLAN approach enforced through 802.1X compatible wireless and wireline distribution equipment.

The classic AAA server for a 802.1X enabled distribution equipment is composed of two parts: a username/password tuple to VLAN mapping database and a RADIUS interface that provides messaging and formatting of the database in a protocol understandable by the 802.1X enabled distribution equipment.

Database: The system extends the classic AAA server for 802.1X enabled distribution equipment approach to address the specific needs of a hospitality guest HSIA network with PANs implemented via 802.1q VLANs in several ways. The system replaces the classic username/password tuple with a single MAC address. Thus devices are mapped to VLANs as opposed to user supplied credentials. The system extends the classic mapping table with an additional field that enables the system to differentiate between guest equipment and premises equipment. This field is used to identify guest equipment entries to be removed from the VLAN mapping database when the guest checks out of the property. Premises supplied equipment including but not limited to smart TVs, set top boxes, smart speakers, door locks, thermostats, window blind controllers and other such devices remain in the database regardless of room occupancy.

The system includes a database table that is not present in the classic 802.1X AAA server to map 802.1q VLANs to rooms. This database table is needed because guests will identify themselves via PMS credentials that typically include the room number when they connect to the network. The VLAN to room mapping database table enables the system to automatically create database entries in the MAC address to VLAN mapping for authenticated devices in order to enable proper authorization of admission to the correct 802.1q VLAN. The VLAN to room mapping table may optionally contain fields to locally cache PMS credentials in order to optimize performance. The most common set of credentials used for PMS authentication are the last name and room number. Thus only the last name needs to be added to the table in order to cache credentials for the most common form of authentication.

It would be possible to use a single wider database table to store all the information described in the two previous tables. However the system is implemented with a separate database table for VLAN to room mapping in order to maintain database third normal form. Significant data redundancy would be present if the system were implemented using a single database storing all of this information into additional fields in the previously described VLAN to device mapping table.

Property Management System Interface: The system includes a PMS interface that is compatible with numerous PMS standard communication protocols including but not limited to Agilisys LMS, Comtrol UHLL, Galaxy HSIA, Hilton OnQ, Infor, InnQuest, Innsist, Micros FIAS, Micros HTNG, Marriot, SMS Host MSIP, etc. In most cases the PMS interface included in the system synchronizes the local credential database the with PMS credentials through a hospitality event driven messaging system. Typical hospitality events that are transmitted through the system include but not limited to guest check in, check out, change in payment terms, etc. In some cases the PMS credentials are checked in real time. The system supports various PMS interface mechanisms as a result of differences in the API supported by the various PMS vendors. Furthermore the system includes support for modifying the guest folio where appropriate. Implemented guest folio interactions include but are not limited to posting charges for Internet use, updating the guest email address as well as saving guest Internet usage statistics into the folio.

RADIUS Interface: The system includes a specialized RADIUS interface for the database that is different from the classic AAA server use to support 802.1X enabled networks. The most common implementations of 802.1X clients present the user with a credential challenge asking for username and password. In a hospitality environment the credentials are typically last name and room number. It is impossible to predict whether the user will enter the last name into the username field and the room number into the password field or vice versa. Thus the specialized RADIUS interface built for this system normalizes the supplied user credentials for validation. The system enables the user to enter the last name and room number into whichever field the user chooses in the 802.1X client credential challenge UI.

Certain implementations of the 802.1X standard prohibit the recovery of the plaintext of the data entered into the password field. This is particularly problematic because the user may enter their PMS credentials (typically room number and last name) into the username and password fields in any order as described previously. The specialized RADIUS interface included in the system includes a mechanism to overcome this problem. Direct search against the RADIUS database with a hash of the password data is performed to validate the user input. If direct search fails then heuristics are used to make a best guess of likely matching password data and hashes are generated for likely matches for comparison. The specialized RADIUS interface may also optionally perform an exhaustive search of all possibilities by hashing all database entries for comparison.

Device Onboarding: The RADIUS Access-Request is examined and the MAC address of the Calling-Station-ID is extracted when the specialized RADIUS interface determines that a user has provided valid credentials. This MAC address is then added to the MAC to VLAN mapping table with the equipment flag set to identify it as a piece of guest equipment. This enables the specialized RADIUS interface incorporated in the system to reply with a 802.1X compatible response that specifies the 802.1q VLAN for the room that the guest is checked into. Thus 802.1X enabled distribution equipment is thus able to enforce the desired L2 topology of assigning a unique 802.1q VLAN for each hospitality guest.

The system also includes a user interface that enables the hospitality service provider to modify the list of MAC addresses of premises supplied equipment that is present in each room. This interface is meant to be used during network deployment as well as when the hospitality property makes a change to premises supplied equipment.

Device Offboarding: The PMS interface of the system responds to a hospitality guest check-out event by deleting all records in the device to VLAN mapping that are marked as being guest supplied. Thus future RADIUS Access-Requests from the 802.1X enabled network distribution equipment will result in an Access-Reject. Furthermore a RADIUS Change of Authority (CoA) and/or RADIUS Disconnect Message (DM) may optionally be sent to the distribution equipment to immediately remove guest devices. This process resets the room PAN to a state that is ready for the arrival of the next guest.

The unique combination of hospitality specific database, and PMS interface and RADIUS interface embodied in the system results in a reliable, secure, high performance and low support volume mechanism that allows hospitality properties to deploy PANs using 802.1q per-room VLAN assignment with zero operator intervention provisioning.

BRIEF DESCRIPTION OF DRAWINGS

FIG. 4. schematically depicts the relevant parts of the authentication database for a typical 802.1x enterprise authentication system with VLAN assignment; and FIG. 5. schematically depicts an embodiment of the database tables used in the system.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Systems, apparatus, and methods described herein may be implemented using digital circuitry, or using one or more computers using well known computer processors, memory units, storage devices, computer software, and other components. Typically, a computer includes a processor for executing instructions and one or more memories for storing instructions and data. A computer may also include, or be coupled to, one or more storage devices, such as one or more magnetic disks, internal hard disks and removable disks, optical disks, etc.

Figure 1:
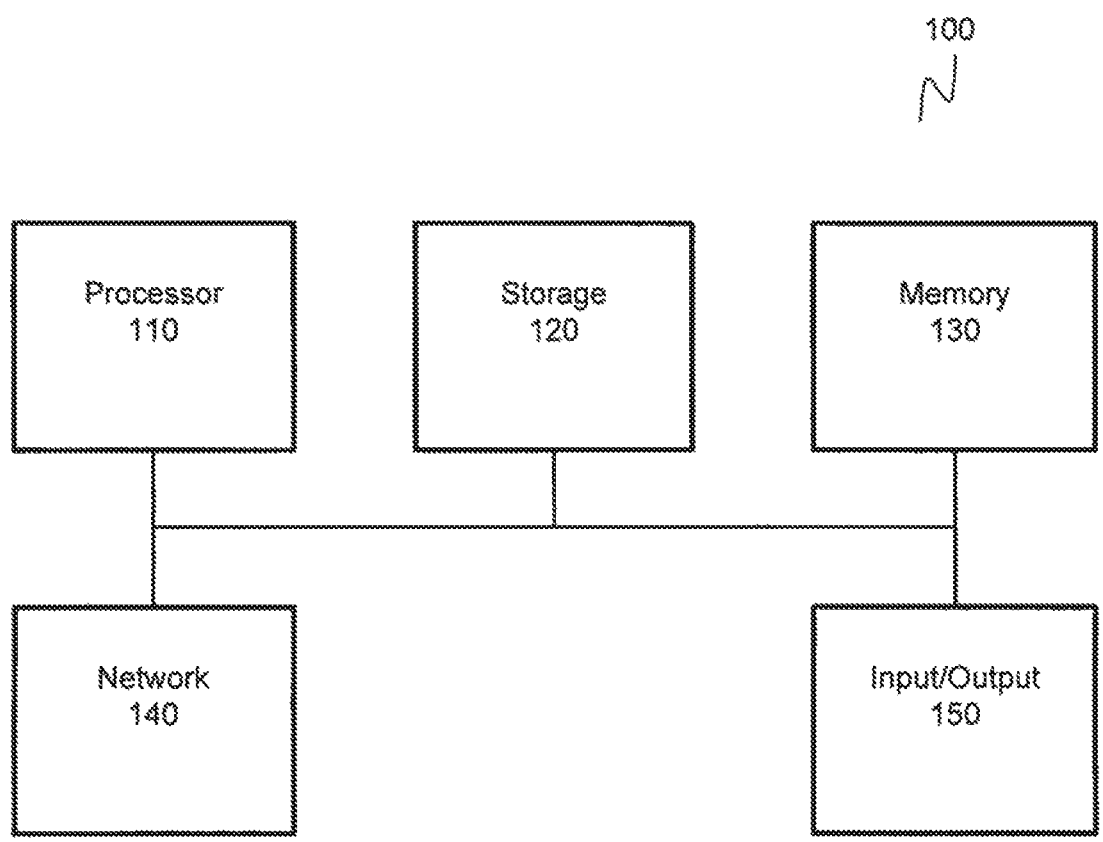
FIG. 1 schematically depicts a high-level diagram of hardware that may be used to implement various aspects of the present system in certain embodiments.

A high-level block diagram of an exemplary computer 100 that may be used to implement systems, apparatus, and methods described herein is illustrated in FIG. 1. For example, the gateway device for VLAN mapping may be implemented by such an exemplary computer. The computer 100 comprises a processor 110 operatively coupled to a data storage device and memory. Processor 110 controls the overall operation of computer 100 by executing computer program instructions that define such operations. The computer program instructions may be stored in data storage device 120, or other non-transitory computer readable medium, and loaded into memory 130 when execution of the computer program instructions is desired. Thus, the modules described for VLAN mapping, housekeeping, and other functions can be defined by the computer program instructions stored in memory 130 and/or data storage device 120 and controlled by processor 110 executing the computer program instructions.

Computer 100 includes one or more network interfaces 140 for communicating with other devices via a network. Computer 100 may also include one or more input/output devices 150 that enable user interaction with computer 100 (e.g., display, keyboard, touchpad, mouse, speakers, buttons, etc.).

Processor 110 can include, among others, special purpose processors with software instructions incorporated in the processor design and general purpose processors with instructions in storage device 120 or memory 130, to control the processor 110, and may be the sole processor or one of multiple processors of computer 100. Processor 110 may be a self-contained computing system, containing multiple cores or processors, a bus, memory controller, cache, etc. A multi-core processor may be symmetric or asymmetric. Processor 110, data storage device 120, and/or memory 130 may include, be supplemented by, or incorporated in, one or more application-specific integrated circuits (ASICs) and/or one or more field programmable gate arrays (FPGAs). It can be appreciated that the disclosure may operate on a computer 100 with one or more processors 110 or on a group or cluster of computers networked together to provide greater processing capability.

Data storage device 120 and memory 130 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Network/communication interface 140 enables the computer 100 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., IEEE 802.16), VLAN (e.g., IEEE 802.1Q), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 140 enables the computer 100 to transfer data, synchronize information, update software, or any other suitable operation.

Input/output devices 150 may include peripherals, such as a printer, scanner, monitor, etc. Input/output devices 150 may also include parts of a computing device. In some embodiments, the computer 100 acts as a headless server computer without input/output devices 150.

Any or all of the systems and apparatus discussed herein, including personal computers, tablet computers, hand-held devices, cellular telephones, servers, database, cloud-computing environments, virtual compute environment and components thereof, may be implemented using a computer such as computer 100.

Figure 2:
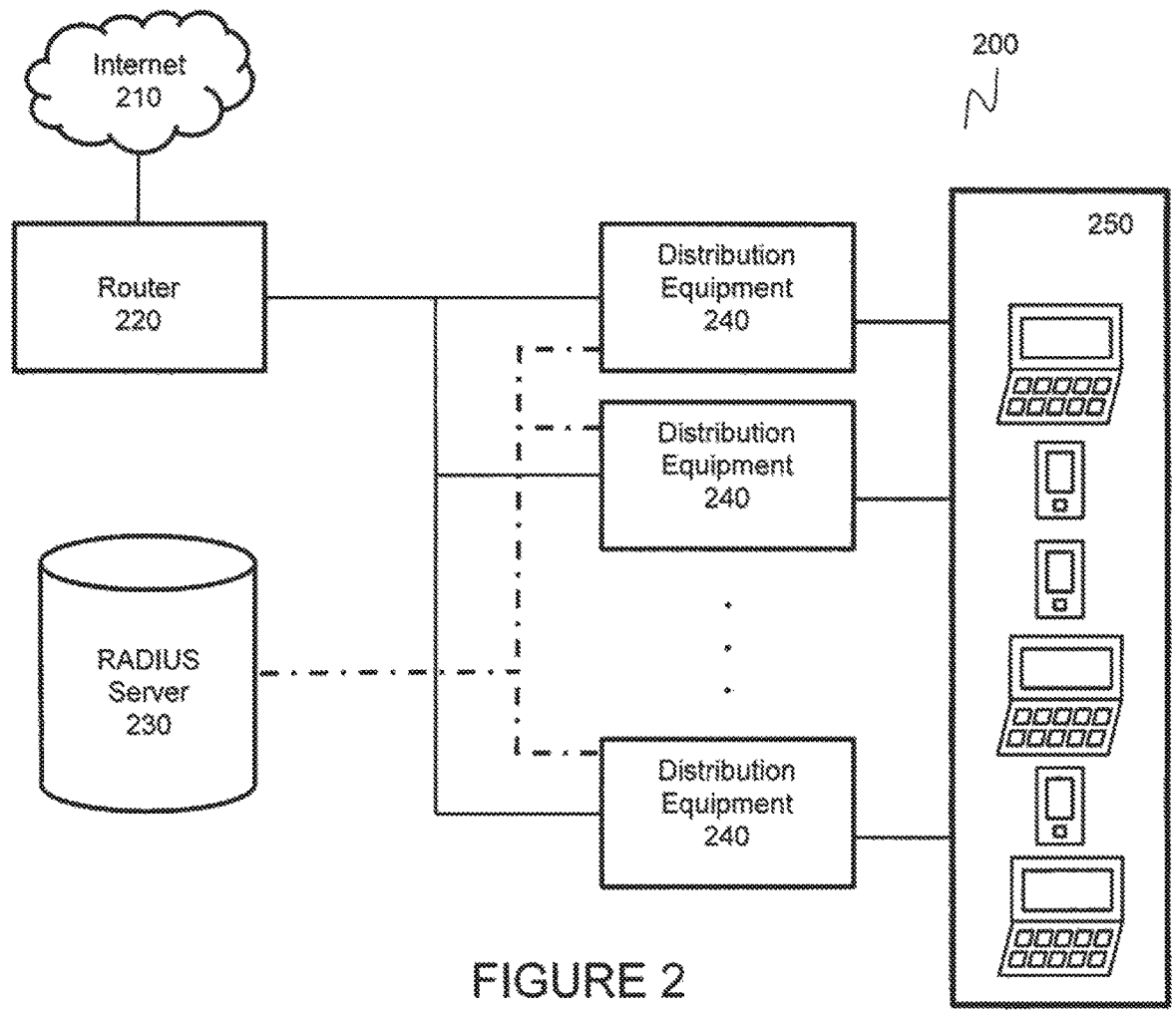
FIG. 2. is a system diagram of the relevant parts of a typical 802.1x enterprise authentication system.

An implementation of an actual computer or computer system may have other structures and may contain other components as well, and referring to FIG. 2 there is seen a high level representation of some of the components of such a computer for illustrative purposes.

FIG. 2. depicts the critical components of an enterprise 802.1X network infrastructure 200 with AAA that is enabled with VLAN assignment. The router 220 provides all OSI layer 3 and above traffic manipulation for client devices 250. The distribution equipment 240 provides all OSI layer 2 and below connectivity between the client devices 250 and the router 220, The distribution equipment 240 may consist of wired switches, wireless access points or some combination switches, access points and associated controllers.

Client devices 250 connect to the distribution equipment 240 by plugging into a wired port or by attaching to a wireless SSID. The distribution equipment 240 is configured to use a RADIUS server 230 for authentication, authorization and optionally for accounting. A positive reply (Access-Accept) from the RADIUS server 230 results in the client device 250 being admitted onto the network 200 through the distribution equipment 240. The critical aspects of the RADIUS server database are described in FIG. 4.

Proper operation of this network 200 requires that the operator configure the router 220 with VLANs that match those being assigned by the RADIUS server 230. Creating matching VLAN configuration across both the router 220 and the distribution equipment 240 is usually a manual process that is both time consuming and error prone. This process is exacerbated by secondary core service features of the router 220 that usually require separate configuration including but not limited to DHCP, DNS, default gateway, NTP, SNMP and other settings. Any change in the VLAN configuration of the network 200 requires multiple configuration changes in various pieces of equipment including but not limited to the router 220 and distribution equipment 240.

Figure 3:
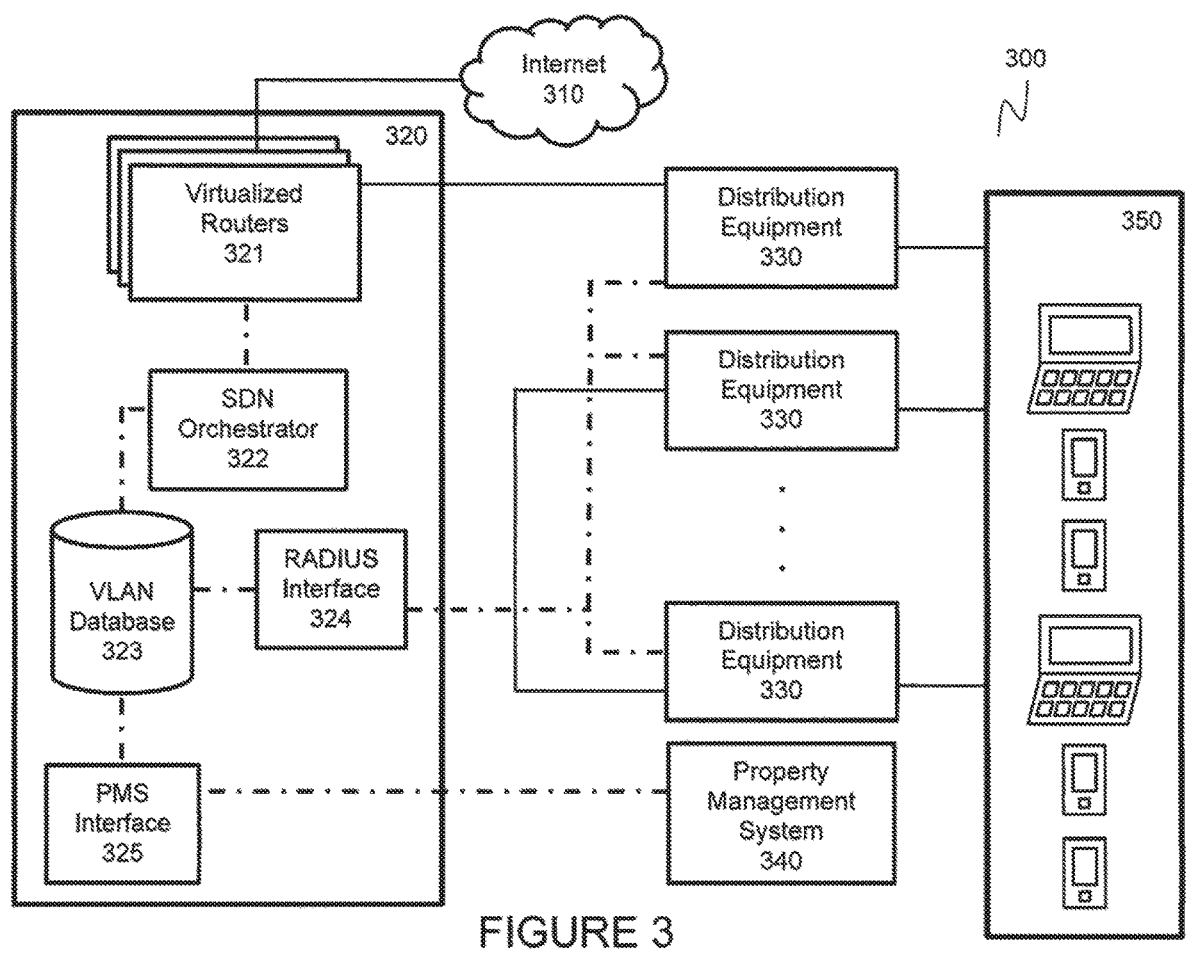
FIG. 3. schematically depicts an embodiment of the system.

FIG. 3. depicts an example hospitality guest HSIA network 300 where the system 320 is used to manage distribution equipment 330 for the purpose of bringing 802.1x enabled PMS authentication with DVLAN assignment to a hospitality property. The system 320 includes a stack of virtualized routers 321 that take the place of the single router 220 in the example enterprise network 200 as previously described. Furthermore the RADIUS Server 230 in the example enterprise network 200 is integrated within the system 320 in this example embodiment.

The stack of virtualized routers 321 incorporated within the system 320 is managed by the SDN orchestrator 322. Virtualized routers 321 are created and destroyed automatically by the SDN orchestrator 322 whenever there are changes to the available VLANs in the VLAN database 323. In some embodiments the SDN orchestrator 322 may also automatically reconfigure the distribution equipment 330 as well. The use of automated orchestration completely removes the need for error prone and labor intensive manual configuration that plagues the previously described example enterprise network 200 of FIG. 2. The use of automated orchestration also enables the operator to make instantaneous and ubiquitous proliferation of network configurations to the entire network for any reason, including but not limited to the scheduled or unscheduled start of a conference, the scheduled or unscheduled arrival of a group or delegation, the scheduled or unscheduled change of physical room topology, etc.

This embodiment of the system 320 includes a property management system (PMS) interface 325 to communicate with the database of guests staying at the hospitality property that is typically stored in a property management system 340. The PMS interface 325 receives updates from the property management system 340 whenever a guest room action occurs including but not limited to when a guest checks in, check outs, changes room, etc. The PMS interface 325 may also be configured to write back information into the guest folio that the system 320 collects including but not limited to Internet data usage statistics, websites visited, IP addresses contacted, VPN connectivity, email addresses collected, advertising behaviors, etc.

The RADIUS server 230 in the example enterprise network 200 as seen in FIG. 2 is replaced with a RADIUS interface 324 that communicates with a VLAN database 323 in this embodiment of the system 320. The use of a RADIUS interface 324 enables the system 320 to make responses to RADIUS Access-Requests from the distribution equipment 330 in that depend on the status of a particular guest and/or room. This approach to credential management radically different and tremendously superior to the manual process of account management that is present in the example enterprise network depicted in FIG. 2.

The admission into a guest HSIA PAN is seamless from the perspective of the hospitality guest. A guest device 350 associates with a wireless SSID or plugs into a wired port that is serviced by the distribution equipment 330 and causes a RADIUS Access-Request to be sent from the distribution equipment 330 to the RADIUS interface 324. The RADIUS interface will reply with an Access-Accept if the guest is presently checked into a guest room and will append the appropriate VLAN onto the Access-Accept that the guest be should be admitted onto.

FIG. 4. describes the organization of RADIUS database 400 in an enterprise 802.1 network infrastructure with VLAN assignment. In this commonly deployed example the credentials 402,404 are stored side by side with a VLAN 406 for admission. A device will pass credentials to distribution equipment that will then pass those same credentials along to a RADIUS server. If the RADIUS server finds matching credentials then the reply will be an Access-Accept with the listed VLAN appended. If the RADIUS server does not find the matching credentials then an Access-Reject will be replied.

FIG. 5. describes an example embodiment of the organization of the VLAN tag assignment database 500 and PMS room database 510 within the inventive system. The example embodiment stores MAC addresses 502 instead of credential pairs in the VLAN tag assignment database that is used by the RADIUS interface with the distribution equipment. Known devices are automatically admitted to the network. Unknown devices are checked against the credentials provided by the guest through their device to the distribution equipment which is then passed to the RADIUS interface. These credentials typically take the form of last name 516 and room number 512. If the credentials are valid then the unknown device becomes a known device by adding an entry into the VLAN tag assignment database 500 that includes the MAC 502 (acquired by querying to SDN orchestrator) and the VLAN 504 (acquired from the VLAN 514 in the PMS room database 510). The embodiment of the system may include an optional premises equipment field 506 for each entry in the VLAN tag assignment database 500 in order to allow the property to statically assign devices to a room that are provided by the property, including but not limited to set top boxes such as Apple TV and Google Chromecast, facility control systems such as thermostats and window blind controllers, security systems such as door locks, motion sensors and surveillance cameras, etc.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A network access management system wherein guest authentication credentials are associated with per-room VLANs comprising:
   a. at least one processor;
   b. memory;
   c. at least one program, wherein the at least one program is stored in the memory and configured to be executed by the at least one processor, the at least one program including instructions to:
      i. implement a property management system interface, wherein guest authentication credentials are collected;
      ii. enable per-room VLANs to be enforced through distribution equipment, wherein each individual VLAN is accessible by specific guests assigned to specific rooms, upon authentication of guest authentication credentials;
      iii. maintain a VLAN to room mapping table stored in a database, wherein guest authentication credentials are associated with each VLAN stored in the VLAN to room mapping table;
      iv. maintain a second table with MAC address to VLAN mapping stored in the database, wherein MAC addresses of guest communications devices are stored in the MAC address to VLAN mapping table upon a first entry of guest authentication credentials wherein guests do not need to re-input guest authentication credentials after a first entry;
      v. implement a remote authentication dial-in user service interface, wherein guests enter authentication credentials to access a per room VLAN.

2. The system of claim 1, wherein the at least one program further includes instructions to implement a DNS orchestrator to automatically create and destroy virtual routers based on the VLAN to room mapping table.

3. The system of claim 2, wherein the property management system interface is configured to modify a guest folio containing guest authentication credentials based on information relating to guest checkouts, guest check-ins, change in payment terms, or posting additional charges.

4. The system of claim 3, wherein the remote authentication dial-in user service interface is configured to normalize supplied user guest authentication credentials for validation.

5. The system of claim 4, wherein the property management system interface deletes MAC addresses in the device to VLAN mapping table based on a guest check-out event.

6. The system of claim 5, wherein the property management system interface deletes MAC addresses in a device to VLAN mapping table based on a manual disconnect message.

7. The system of claim 6, wherein the system is implemented in a hospitality environment.

8. A method for associating guest authentication credentials with per-room VLANs, the method comprising:
   i. implementing a property management system interface, wherein guest authentication credentials are collected;
   ii. enabling per-room VLANs to be enforced through distribution equipment, wherein each individual VLAN is accessible by specific guests assigned to specific rooms, upon authentication of guest authentication credentials;
   iii initializing and maintaining a VLAN to room mapping table stored in a database, wherein guest authentication credentials are associated with each VLAN stored in the VLAN to room mapping table;
   iv. implementing a remote authentication dial-in user service interface, wherein guests enter authentication credentials prior to being allowed access to a per room VLAN.

9. The method of claim 8, further comprising the property management system interface synchronizing a local credential database with credentials for the property management system through a hospitality event driven messaging system.

10. The method of claim 8, further comprising the property management system interface being configured to modify a guest folio based on information relating to guest checkouts, guest check-ins, change in payment terms, or posting additional charges.

11. The method of claim 8, further comprising implementing a DNS orchestrator to automatically create and destroy virtual routers based on the VLAN to room mapping table.

12. The method of claim 8, further comprising the remote authentication dial-in user service interface being configured to normalize supplied user credentials for validation, wherein the supplied user credentials may be entered in either of two fields and the remote authentication dial-in user service interface is able validate the credentials even if they are entered in the wrong field by the end user.

13. The method of claim 8, further comprising the property management system interface deleting records in a MAC address to VLAN mapping table based on a guest check-out event.

14. The method of claim 8, further comprising the property management system interface deleting records in a MAC address to VLAN mapping table based on a manual disconnect message.

15. The method of claim 8, further comprising the method being implemented in a hospitality environment.

16. A non-transitory computer readable storage medium having stored therein instructions, which when executed by a computing device, cause the computing device to:
   i. implement a property management system interface, wherein guest authentication credentials are collected;
   ii. enable per-room VLANs to be enforced through distribution equipment, wherein each individual VLAN is accessible by specific guests assigned to specific rooms, upon authentication of guest authentication credentials;
   iii. maintain a VLAN to room mapping table stored in a database, wherein guest authentication credentials are associated with each VLAN stored in the VLAN to room mapping table;
   iv. maintain a MAC address to VLAN mapping table stored in the database, wherein MAC addresses of guest communication devices are stored in the MAC address to VLAN mapping table upon a first entry of guest authentication credentials, wherein guests do not need re-input guest authentication credentials after the first entry;
   v. implement a remote authentication dial-in user service interface, wherein guests enter authentication credentials prior to accessing a per room VLAN.

17. The non-transitory computer readable storage medium of claim 16, further comprising the property management system interface synchronizing a local credential database with credentials for the property management system through a hospitality event driven messaging system.

18. The non-transitory computer readable storage medium of claim 17, further comprising the property management system interface being configured to modify a guest folio based on information relating to guest checkouts, guest check-ins, change in payment terms, or posting additional charges.

19. The non-transitory computer readable storage medium of claim 18, further comprising the remote authentication dial-in user service interface being configured to normalize supplied user credentials for validation, wherein the supplied user credentials may be entered in either of two fields and the remote authentication dial-in user service interface is able validate the credentials even if they are entered in the wrong field by the end user.

20. The non-transitory computer readable storage medium of claim 19, further comprising the property management system interface deleting records in the MAC address to VLAN mapping table based on either a guest check-out event or manual disconnect message.

\* \* \* \* \*